Sept. 22, 1959   L. KLABOCH ET AL   2,904,997
MEASURING ELEMENTS FOR MEASURING OF FORCES
Filed Sept. 4, 1956

INVENTORS
Ladislav Klaboch, Miroslav Stastny
BY
Richard Ernst
Agt

United States Patent Office 2,904,997
Patented Sept. 22, 1959

2,904,997

MEASURING ELEMENTS FOR MEASURING OF FORCES

Ladislav Klaboch and Miroslav Stastný, Prague, Czechoslovakia, assignors to Výzkumný a Zhusebni Letecký Ustav, Letnany, near Prague, Czechoslovakia Application September 4, 1956, Serial No. 607,963

Claims priority, application Czechoslovakia September 9, 1955

7 Claims. (Cl. 73—141)

In order to measure the expansion or contraction of different bodies, resistance wires fixed on the surface of the body are frequently used. The resistance wire follows the deformations of the surface of the body and, in response to the lengthening or shortening of the wire, its electric resistance is changed, with the resistance changes being measured by electrical measuring instruments. The measurements are as a rule performed by means of so called strain gauges, having a resistance wire secured to a paper base or other supporting film which is glued to the surface of the body being tested.

For the measurement of forces transmitted from one body to another dynamometers are used, in which the transmitted force is measured by means of a member interposed between the bodies, as a rule an axially loaded cylinder or prism with one or more strain gauges glued to the surfaces thereof. The forces acting upon the force transmitting member are computed from the relative deformations thereof due to said forces.

A drawback of such dynamometers is that the generally used strain gauges when subject to continuous stress often suffer a shifting between the base paper and wire or between the base paper and supporting surface respectively, especially if such measurements are effected under difficult conditions, as for instance when measuring axial forces in bearings of steam turbine rotors, where dynamometers with glued-on strain gauges cannot be used. Under such conditions, the effects of temperature, of oil and the static condition of the forces present, which influence the adhesive paste of the strain gauge rather unfavorably so that it loses its firmness and becomes plastic and causes a shifting of the zero point for the measurements.

For these reasons, measurements of axial forces of steam turbine rotors are presently performed by measuring the force behind the Curtiss wheel. Of course, this does not give the values of the axial forces and the possibility of its use is limited.

It is an object of the present invention to provide a transducer measuring element which permits the measuring of such forces even under the most unfavourable conditions, while compensating for the effects of temperature changes, ageing and similar factors which would otherwise influence the accuracy.

In accordance with this invention, a measuring element includes a body which is generally in the form of a hollow cylinder of normally circular cross-section which is radially loaded by the force to be measured, rather than being axially loaded, as heretofore, so that the radial load causes the normal circular cross-section to be converted into an elliptical cross-section. At least one coil of measuring wire is wound on the body at a location where the latter is formed to provide the coil with an elongated shape, for example, either an oval or rectangular shape. As the normal cylindrical form of the body is distorted by the applied radial load to assume an elliptical cross-section, the length of the wire in the winding or coil changes and the corresponding change in electrical resistance can then be measured by conventional electrical means as a function of the applied load.

In a preferred embodiment of the invention, two coils of measuring wire are provided on the cylindrical body with both coils being coaxial with the body and with one coil acting as a compensation winding for the other coil. Further, it is particularly advantageous for the direction of elongation of one coil to be disposed at right angles to the direction of elongation of the other coil so that, as the body assumes an elliptical configuration under a radially applied load, the lengths of the wires in the two coils vary oppositely to cause corresponding opposite changes in their electrical resistances. Thus, when the two coils are connected to a Wheatstone bridge, in the usual manner, to measure the changes in electrical resistance as a function of the applied load, the sensitivity of the measurement of the load is doubled as compared with an arrangement wherein only one coil is influenced by the configurational changes of the cylindrical body.

The above, and other objects, features and advantages of the invention, will be apparent in the following detailed description of illustrative embodiments of the invention which is to be read in connection with the accompanying drawing forming a part hereof, and wherein.

Figure 1:
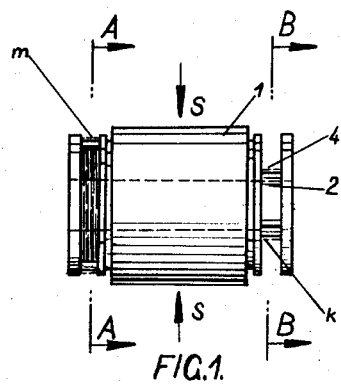
Fig. 1 is a side elevational view of a measuring element in accordance with one embodiment of this invention.
Figures 2, 3:
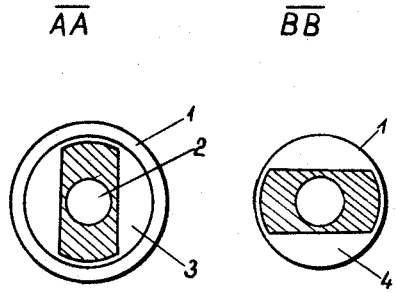
Fig. 2 is a sectional view taken along the lines A—A of Fig. 1.
Fig. 3 is a sectional view taken along the line B—B of Fig. 1.

Referring to Fig. 1, it will be seen that a measuring element embodying the invention includes a substantially cylindrical measuring body 1 having an axial bore 2. Adjacent the opposite ends of this body parallel bottomed grooves 3, 4 are provided for accommodating measuring coils $m$, $k$. It will be seen that the parallel bottomed grooves or recesses 3 adjacent one end of body 1 (Figs. 1 and 2) are symmetrical with respect to the axis of the body and extend at right angles to the parallel bottomed grooves or recesses 4 adjacent the opposite end (Figs. 1 and 3) which are also symmetrical with respect to the axis of body 1, so that the coils $m$ and $k$ formed by wire wound in the recesses 3 and 4, respectively, are coaxial with the body and oblong or rectangular with the direction of elongation of the coil $m$ being at right angles to the direction of elongation of the coil $k$.

Figure 4:
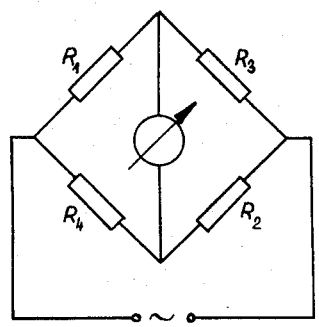
Fig. 4 is a wiring diagram showing how the measuring element embodying the invention is associated with an electrical measuring device.

Fig. 4 shows a wiring diagram for the measuring element using substantially a Wheatstone bridge circuit, as is commonly used for this kind of measurement. In the illustrated circuit, $R_1$ represents the resistance of the measuring coil $m$, $R_3$ the resistance of the compensating coil $k$, and $R_2$ and $R_4$ are reference resistances of the measuring bridge. The coils $m$ and $k$ each including several turns have identical properties apart from the different directions of their elongation.

Figure 5:
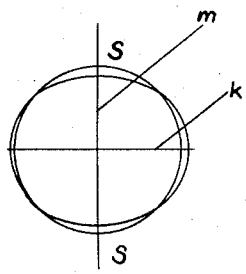
Fig. 5 is a diagrammatic view illustrating the distortion of the body of the element of Figs. 1, 2 and 3 under a radially applied load.

In Fig. 5, one line represents the normal circular shape of the body 1 without the action of radial forces while the other line represents the oval shape of this body when the radial forces S are applied thereto. Due to this change the longitudinal axes of coils $m$ and $k$ are shortened and lengthened, respectively, resulting in a decrease and increase of the resistance of these coils.

As is commonly known, the equilibrium of the bridge circuit is represented by the following equation:

$$R_1 . R_2 = R_3 . R_4 \tag{I}$$

so that the effects of changes in the resistance of coils $m$ and $k$ due to deformations of the body 1, which changes are of opposite sense, are added to each other, resulting in a doubled sensitivity. Changes in resistance from other causes, for instance due to heat or ageing, cause the values of resistances $R_1$ of coil $m$ and $R_2$ of coil $k$ to both increase or decrease so that their influence is, according to Equation I, nullified, provided their values are properly chosen. The measuring element is therefore practically immune to changes of temperature. The coil $k$ acts in this circuit both as a measuring and compensating coil.

Figure 6:
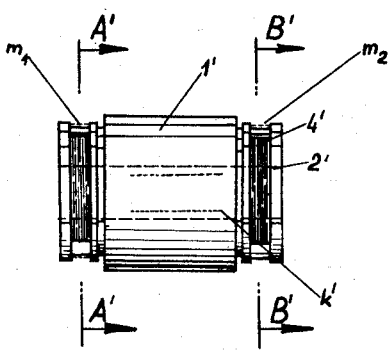
Fig. 6 is a view similar to that of Fig. 1, but showing another embodiment of the invention.
Figure 7:
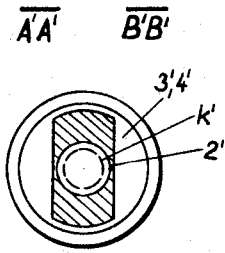
Fig. 7 is a sectional view along the line A'—A' of Fig. 6.
Figure 8:
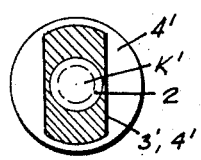
Fig. 8 is a sectional view along the line B'—B' of Fig. 6.

Referring now to Figs. 6, 7 and 8, it will be seen that the measuring element there illustrated also includes a cylindrical body 1' with an axial bore 2' extending therethrough, and with parallel bottomed grooves or recesses 3' and 4' formed in the outer surface of the body adjacent the opposite ends thereof and arranged symmetrically with respect to the axis of the body. It will be apparent in Figs. 7 and 8 that the bottoms of the grooves or recesses 3' extend in the same direction as the bottoms of the grooves or recesses 4', as distinguished from the first described embodiment wherein the grooves 3 extended at right angles with respect to the grooves 4. The grooves 3' and 4' accommodate coils $m_1$ and $m_2$ which are again oblong, and which, in this case, are arranged so that the directions of elongation of the coils are parallel. When these coils are connected in series, the resistance of both coils $R_1$ equals the sum of the resistances of the coils $m_1$ and $m_2$. The compensating coil $k$ is situated in the bore 2' of the body 1'. The coils $m_1$ and $m_2$ and $k'$ are again connected according to the diagram of Fig. 4 so that changes of resistance due to temperature changes are again compensated. For constant temperatures only the resistance $R_1$ changes in response to varying of the lengths of the wires forming coils $m_1$ and $m_2$ by distortion of body 1' when a radial load is applied to the latter.

The advantages and possibilities of use of the object of invention are considerable. The relatively simple measuring element may be situated permanently at any desired place, so that measurements of forces acting on the measuring element may be repeatedly performed.

The measuring elements embodying the invention may be advantageously used for effecting many different measurements, for example, in the building industry, for measuring undetermined static forces in bridge construction, in the mining industry for the control of the stress of props, and for measuring the axial forces acting on a steam turbine rotor.

What we claim is:

1. A measuring element adapted to be interposed between two members for measurement of the load transmitted between such members; said element comprising a hollow cylindrical body with a normally circular cross-section and adapted to have the load to be measured applied radially to said body so that the cross-section of the latter will become generally elliptical under the applied load, and at least one coil consisting of wire wound on said body and having a resistance that varies with the length of the wire, said coil being co-axial with said body and elongated in a direction extending diametrically with respect to said axis of the body so that the length of said wire of the coil will vary in response to alteration of the cross-section of said body from said circular cross-section to said elliptical cross-section by a load applied radially to the body.

2. A measuring element as in claim 1; wherein said body has a pair of parallel bottomed recesses in its outer surface at diametrically opposed locations and extending perpendicular to said axis of the body for each coil, said wire of the coil being wound around said body at the related pair of recesses and received in the latter so that the recesses impart the elongation to the coil.

3. A measuring element as in claim 1; further comprising another coil on said body coaxial with the latter, said other coil being spaced axially from said one coil and also being elongated in a direction extending diametrically with respect to said axis of the body so that the resistances of said one coil and of said other coil are both influenced by changes in the cross-sectional shape of said body under a load applied radially to the latter.

4. A measuring element as in claim 3; wherein said one coil and said other coil are both elongated in the same diametrical direction to be identically influenced by changes in the cross-sectional shape of said body; and further comprising a compensating coil coaxial with said hollow body and disposed in the interior of the latter.

5. A measuring element as in claim 3; wherein said diametrical direction of elongation of said other coil is at right angles to said diametrical direction of elongation of said one coil so that the resistances of said one coil and said other coil, respectively, are oppositely influenced by changes in the cross-sectional shape of said body under a load applied radially to the latter.

6. A measuring element as in claim 5; in combination with a Wheatstone bridge circuit, and wherein said one coil and said other coil are interposed in opposed legs of said bridge so that the changes in the resistances of said coils resulting from changes in the cross-sectional shape of the body by the applied load are cumulative, thereby to provide a relatively high sensitivity to the applied load, and said one coil and said other coil are identical apart from the directions of elongation thereof so that said other coil acts to compensate for any changes in the resistance of said one coil resulting from causes other than the applied load.

7. A measuring element as in claim 5; wherein said body has a pair of parallel bottomed recesses in its outer surface for each of said coils, each pair of recesses being disposed at diametrically opposed sides of said body and extending at right angles to said axis of the body, the wire of each coil being wound around the body at the related pair of recesses and received in the latter so that the pairs of recesses impart the elongations to the coils.

References Cited in the file of this patent
UNITED STATES PATENTS
2,727,387     Cherniak _____ Dec. 20, 1955